INVENTORS
Thomas O. Mehan
George J. Uhlig
BY
Hinkle, Horton, Ahlberg, Hansmann & Wupper
Attorneys.

INVENTORS
Thomas O. Mehan
George J. Uhlig
BY
Hinkle, Horton, Ahlberg
Hausmann & Wupper
Attorneys.

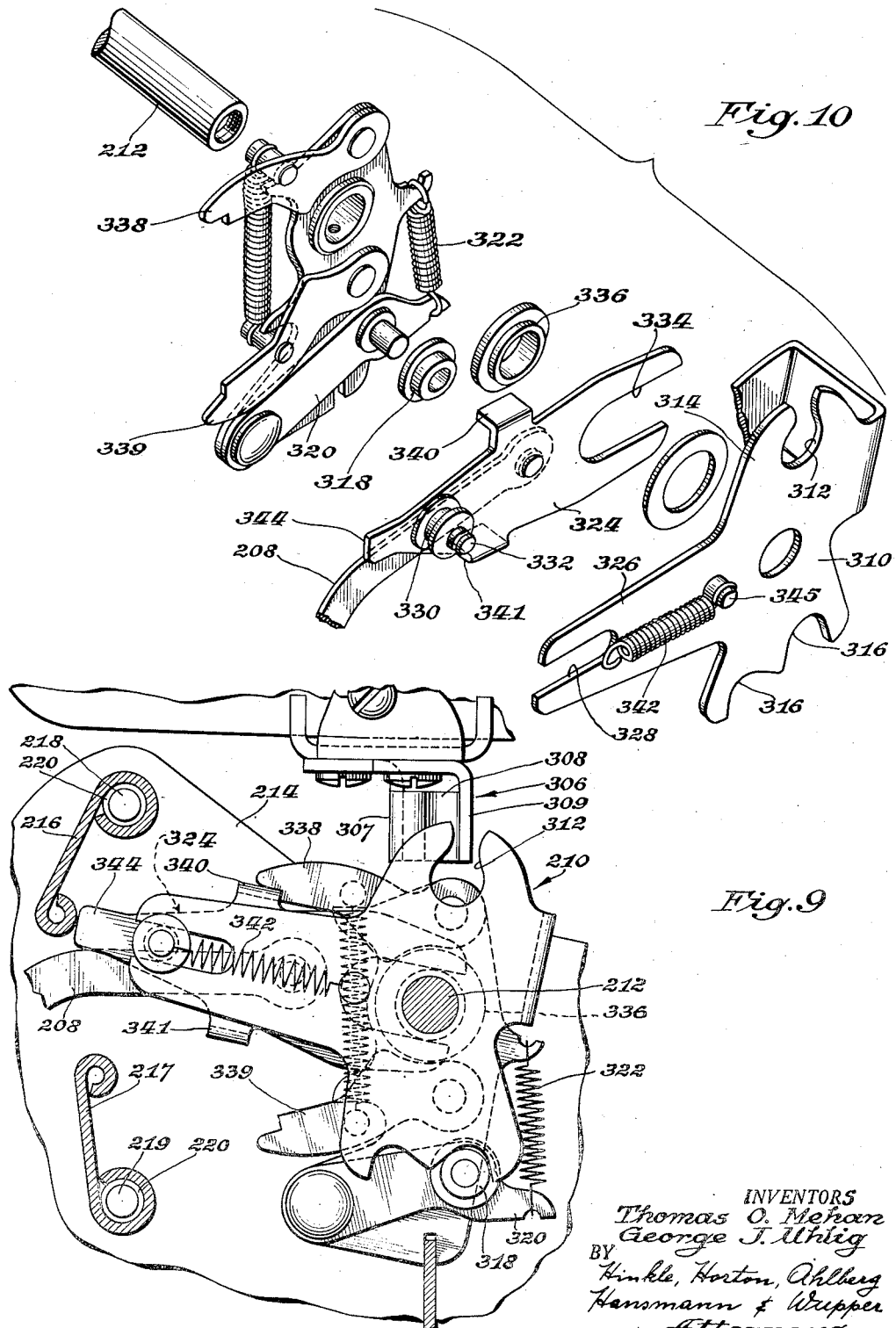

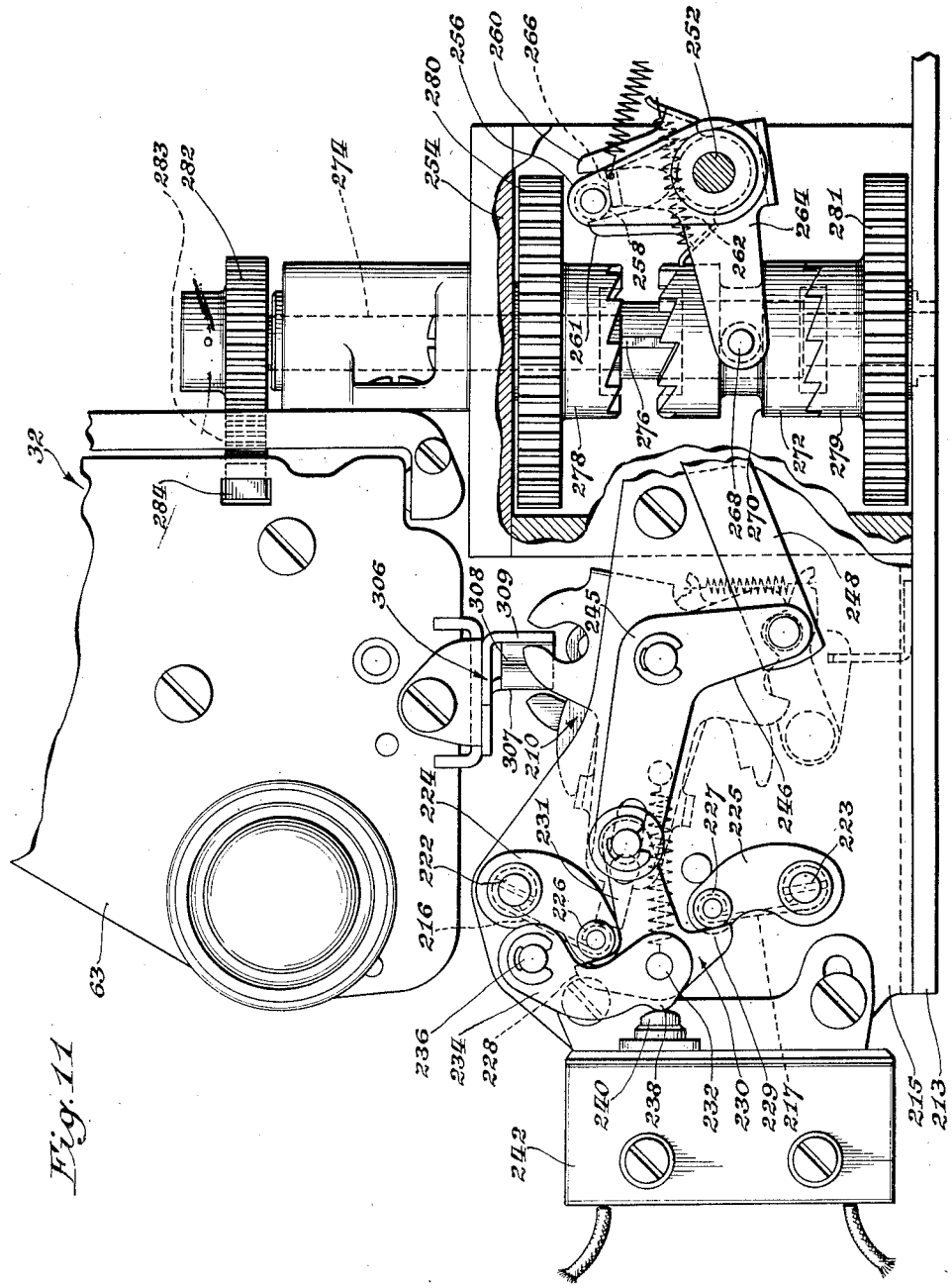

May 20, 1952 T. O. MEHAN ET AL 2,597,162
COLUMNAR SELECTION CARRIAGE
Filed May 14, 1949 11 Sheets-Sheet 10

INVENTORS.
Thomas O. Mehan
George J. Uhlig
BY
Hinkle, Horton, Ahlberg, Hansmann & Wupper
Attorneys.

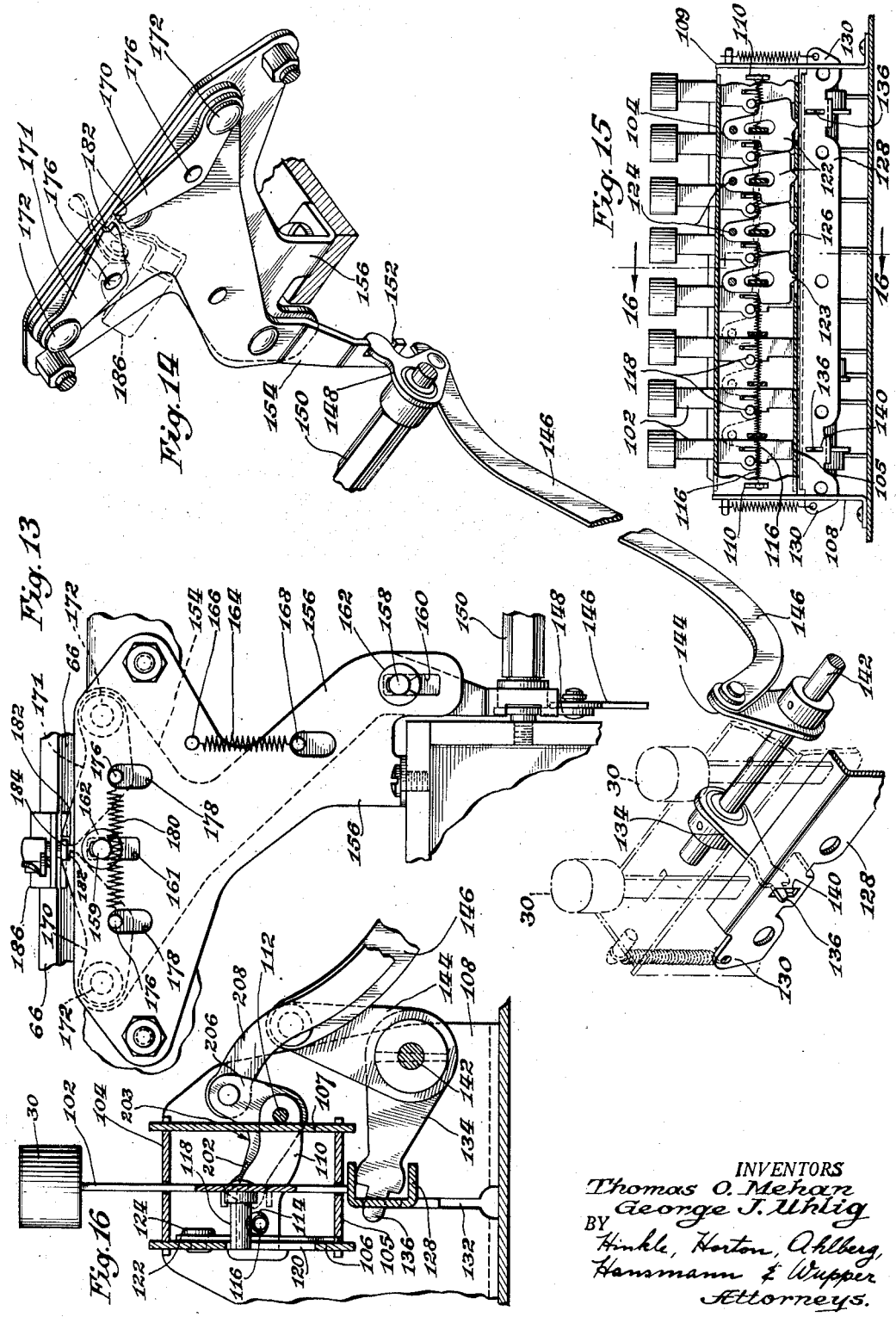

Patented May 20, 1952

2,597,162

UNITED STATES PATENT OFFICE 2,597,162

COLUMNAR SELECTION CARRIAGE

Thomas O. Mehan and George J. Uhlig, Park Ridge, Ill., assignors to Victor Adding Machine Co., Chicago, Ill., a corporation of Illinois Application May 14, 1949, Serial No. 93,318

13 Claims. (Cl. 197—177)

Our invention relates generally to calculating machines and more particularly to improved means for positioning the printing platen carriage thereof.

One of the objects of the invention is to provide a calculating machine, having a traveling carriage, with improved means whereby the carriage may be positioned in any one of a plurality of columnar positions by selective depression of keys, the carriage traveling the shortest distance from one position to another under the control of column selecting keys.

A further object of the invention is to provide a calculating machine having a shiftable carriage capable of being adjusted to be shifted to any one of a plurality of positions in which selecting keys are operable to select any position to which the carriage is to be moved, the mechanism being of such character that the carriage will move in the correct direction to attain the position selected by the depression of the key directly, without reversing its direction of travel.

A further object is to provide an improved carriage shifting mechanism having a plurality of adjustably positionable columnar stops having parts the positions of which are controlled by the carriage, whereby when a stop to the right of the position the carriage happens to be in is operated the carriage will move to the right, and vice versa.

A further object is to provide a carriage tabulating mechanism in which the carriage is driven in both directions by the same motor.

A further object is to provide a carriage tabulating means which is electric motor driven, but in which the final stopping position is determined by mechanical means.

A further object is to provide a carriage positioning apparatus in which the carriage has a plurality of selectively set stop positions, and in which the carriage may be shifted directly from any position to any other position.

Other objects will appear from the following description reference being had to the accompanying drawings in which:

Figs. 8 and 9 are views similar to Fig. 7, showing the parts in different positions;

Fig. 10 is an exploded view of one of the carriage positioning assemblies;

Fig. 11 is a right hand elevational view of the carriage positioning mechanism, portions of the clutch housing being shown in fragmentary sections;

Fig. 13 is a detailed rear elevational view showing the carriage locking mechanism;

Fig. 14 is a perspective view of the key operated carriage locking mechanism;

Fig. 15 is a vertical sectional view of the carriage positioning keyboard mechanism;

Fig. 16 is an enlarged vertical sectional view taken on the line 16—16 of Fig. 15;

Fig. 17 is a view similar to Fig. 9, showing the parts in normal positions; and

Fig. 18 is a circuit diagram showing the motor control circuits.

Figure 1:
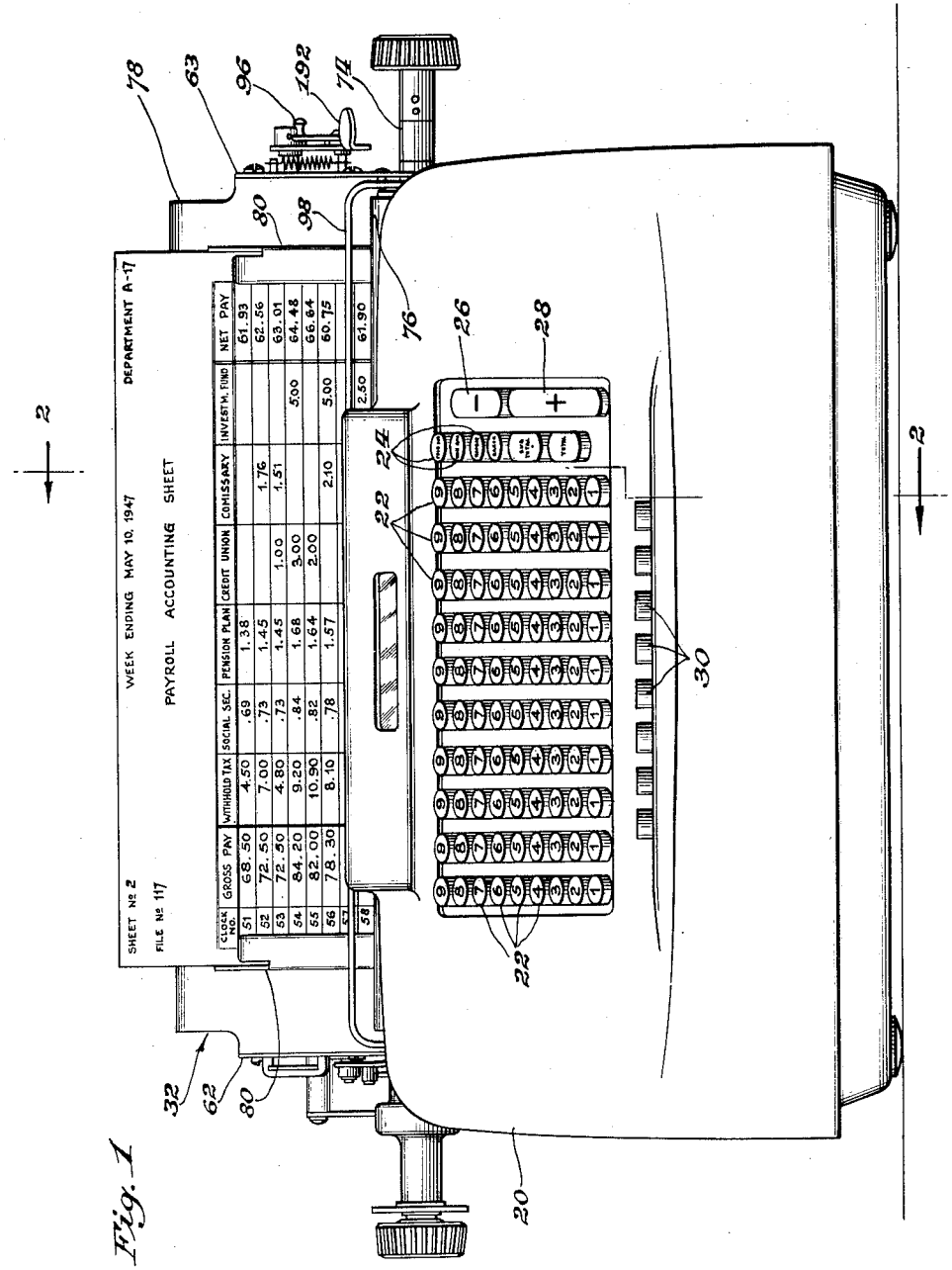
Fig. 1 is a front elevational view of the complete machine.

The invention is illustrated as incorporated in a full keyboard calculating machine, comprising a case 20 having the customary numeral keys 22, control keys 24, a subtract motor starting bar 26, and an add motor starting key 28. Directly beneath the numeral keyboard is a row of eight carriage positioning keys 30. As will hereinafter appear, these keys are utilized to control the movement of the carriage 32 to any one of eight preset positions.

The adding machine may be of any suitable type, but is illustrated of the type shown in greater detail in the patent to Thomas L. Mehan and Hunter E. Hooe No. 2,429,522. In general, the adding or calculating machine comprises a plurality of actuators 34 (Fig. 2), which are guided on cross rods 36 and 37, and a restoring bar 39 extending through suitable slots formed in the actuators. Each of the actuators 34 is connected by a crossover plate 38 with a slide 40, there being one slide beneath each vertical row of numeral keys 22. The rearward ends of the actuators 34 have rack teeth 42 thereon for meshing engagement with pinions 44 operating an accumulator 49 in the customary manner through intermediate segments 45

Printing type wheels 46 are mounted upon individual arms 50 and are adapted to be brought into meshing engagement through suitable idler pinions 52, with the segments 45. The machine is provided with the usual controls for determining the character of the operation to be performed. Additional accumulators may be incorporated in the machine, and for driving such accumulators, the actuators 34 are provided with racks 53.

The carriage 32 is mounted on a pair of guide rails 54 and 56 which may be integral and are suitably secured to the frame of the machine. The carriage comprises a frame bar 58, the rails 54 and 56 as well as the frame bar 58 being formed with suitable opposed guide grooves or rails for free rollers 60. The carriage includes a pair of end plates 62 and 63, a square cross shaft 66, and cross rods 64, 68, 70 and 72 which have their ends secured to the end plates 62 and 63. The end plates also provide bearings for a platen shaft 74 which carries the usual platen 76. A paper guide plate 78 is also secured to the end plates 62 and 63.

Figure 5:
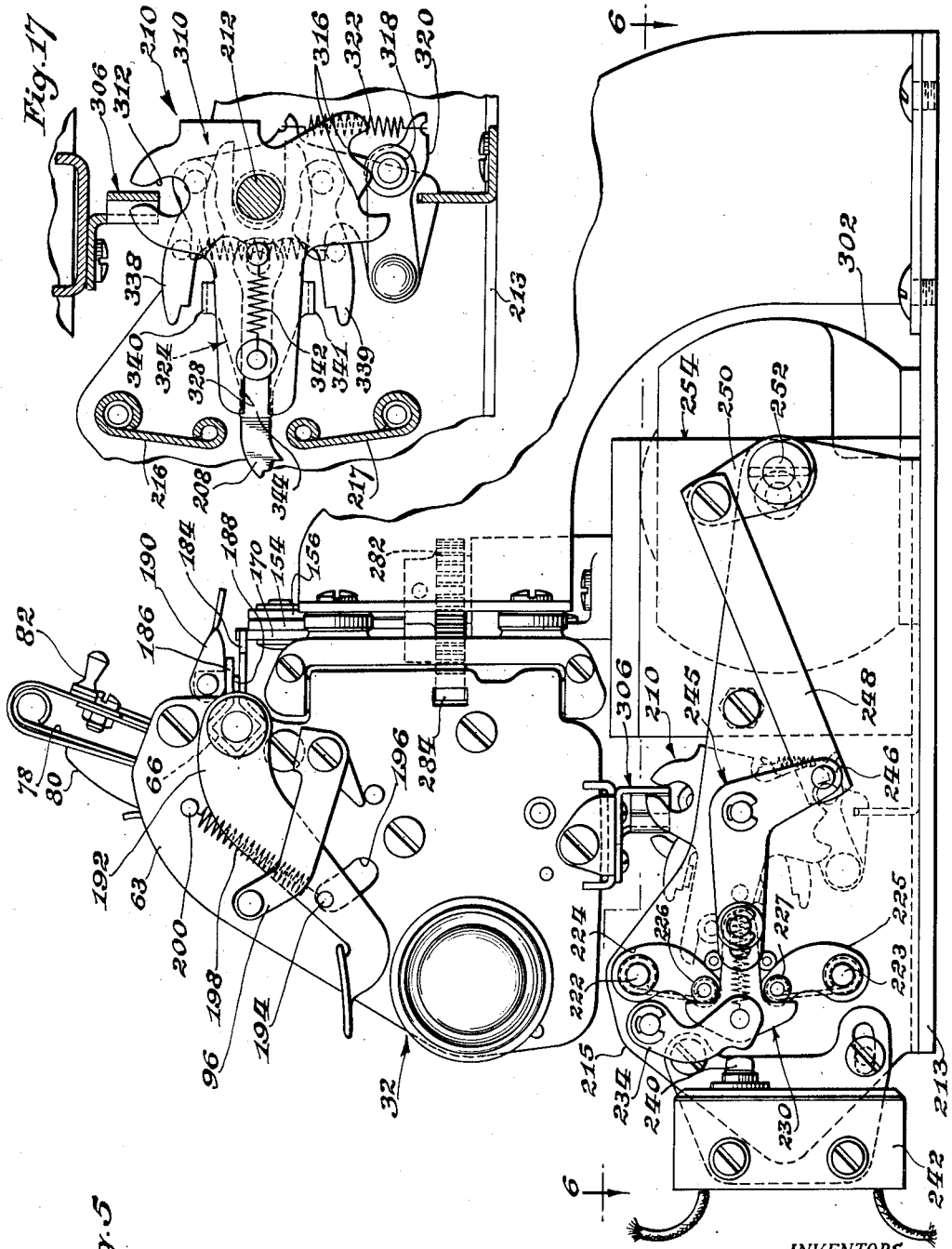
Fig. 5 is a right side elevational view, to an enlarged scale, showing the carriage and parts of the mechanism used to position the same in selected columnar position.

Paper edge guides 80 (Fig. 2) are slidably mounted on the paper guide plate 78 and may be secured in adjusted position by a suitable clamping mechanism 82. The clamps 82 of each of the paper edge guides cooperate with the cross rod 64, which also serves as a support for the paper edge guides. The paper is held against the platen 76 by three pairs of feed rolls 84 mounted upon a rocking frame 86, the frame being pressed toward the platen 76 by levers 88 pivoted on the rod 68 and tensioned by suitable springs 90. The springs 90 are anchored upon the brackets 92 secured to the frame 58, these brackets also serving as supports for the rods 94 upon which the levers 88 are pivoted. The upper ends of the levers 88 rest in milled segment shaped slots formed in the rod 68. The rod 68 has a paper release handle 96 (Figs. 1, 3 and 5) secured to the end of the shaft 68 so as to be rotatable through a small angle and thus swing the levers 88 counterclockwise to withdraw the paper feed rollers 84 from the platen 76. A paper hold-down bail wire 98 is pivoted on the end plates 62 and 63, and a slotted paper guide and tear strip 100 (Fig. 3) is suitably secured to the cross rod 72 and is adapted for use with the usual roll of paper tape.

Figure 2:
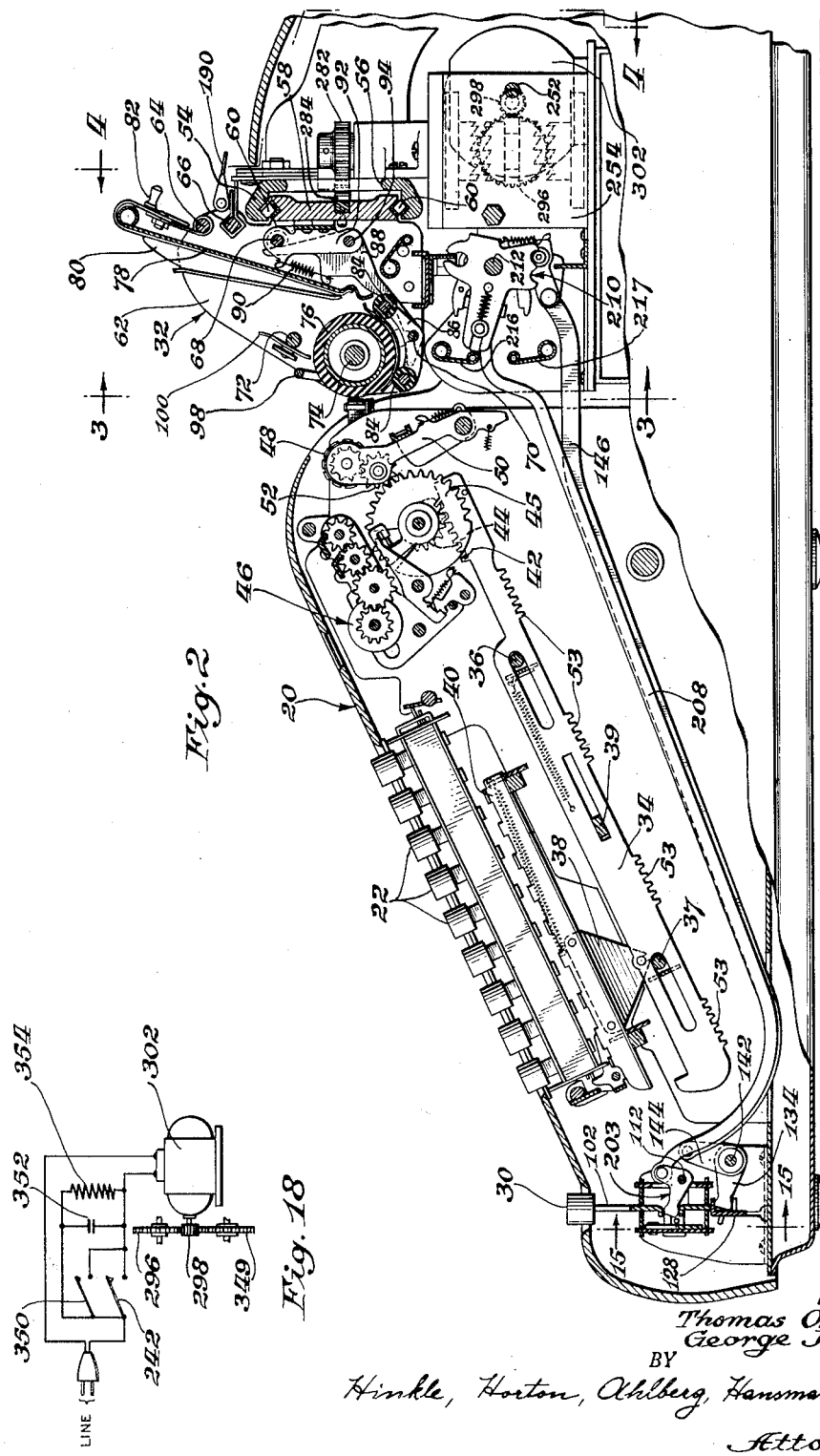
Fig. 2 is a longitudinal sectional view thereof taken on the line 2—2 of Fig. 1.
Figure 3:
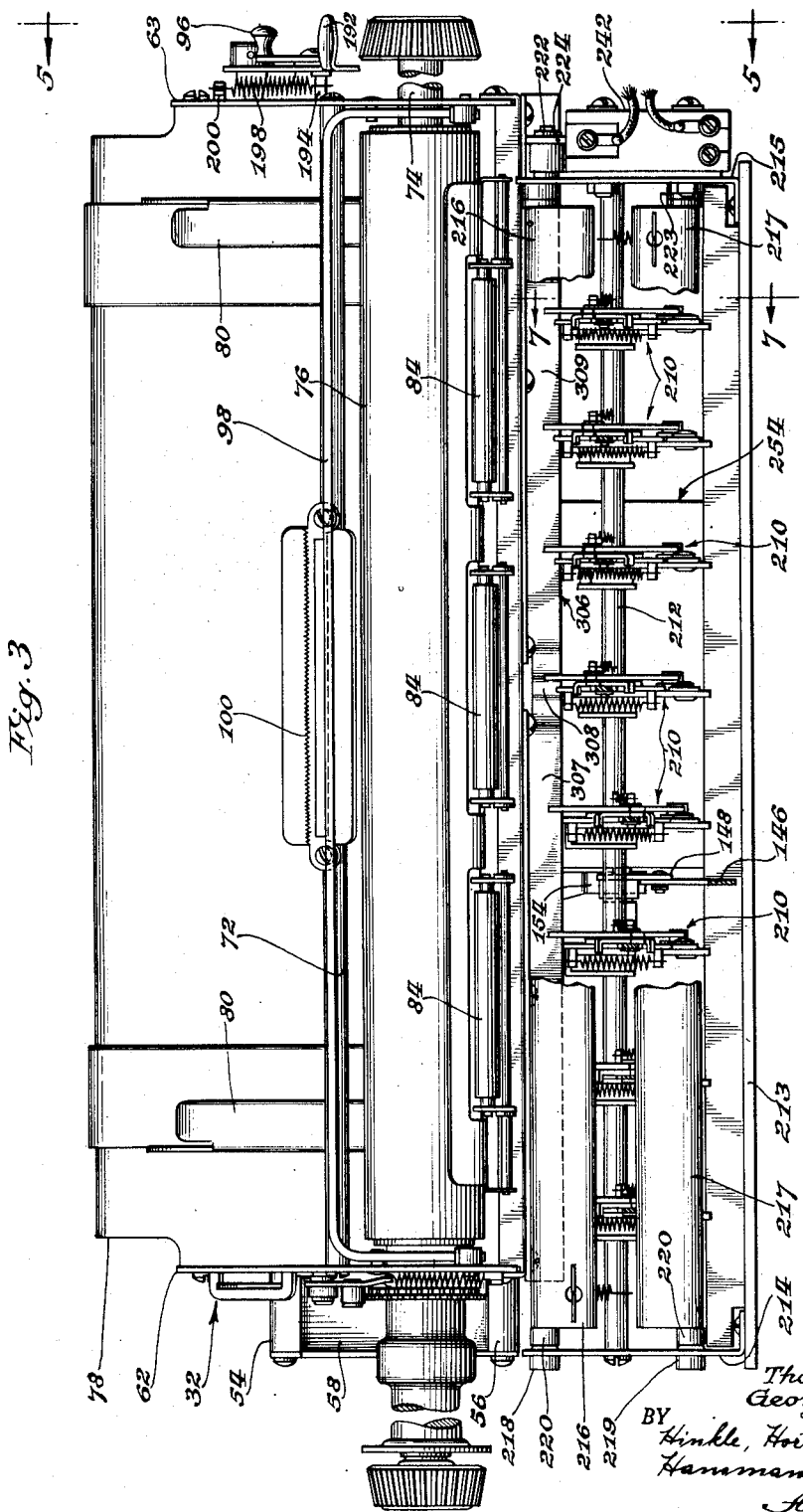
Fig. 3 is a transverse vertical sectional view, taken on the line 3—3 of Fig. 2.

As best shown in Figs. 2 and 16 the carriage positioning buttons 30 are each provided with a stem 102 mounted for sliding movement in a key stem frame which has a top plate 104, bottom plate 105, a front plate 106, and a rear vertical plate 107, the ends of the plates 104 to 107 being provided with suitable projections extending into end supporting brackets 108 and 109 (Fig. 15). The top and bottom plates 104 and 105 are provided with projections extending through complementary slots formed in the front and rear plates 106, 107, and the frame is held in assembled position by a plurality of spring supporting links 110 which extend through slots in the plates 106 and 107 and are held in position by a cross rod 112. Each of the spring supporting links 110 is provided with an opening 114 for the reception of a long coil spring 116, the ends of the spring 116 being secured to the endmost links 110. Each of the key stems 102 has a forwardly projecting stud 118 riveted thereto, these studs overlying the spring 116 and extending forwardly through guide slots 120 formed in the front plate 106.

The studs 118 also project between pivoted pendants 122 mounted on shouldered rivets 124 on the inside of the front plate 106. As best shown in Fig. 15, the pendants 122 are so shaped and positioned that only one key 30 can be depressed at a time, the remaining keys being locked against depression. The lower ends of the pendants have tips 123 which are guided in suitable short slots 126 formed in the bottom plate 105.

The lower ends of the key stems 102 rest upon a universal slide bar 128 which is channel shaped and has ears 130 projecting through guide slots 132 formed in the end brackets 108, 109. The bar 128 is supported by a pair of arms 134 which have ends 136 projecting through slots 140 in the bar.

The arms 134 are pinned to a rotatable shaft 142 mounted in the frame plates of the machine. An arm 144 is also pinned to the shaft 142 and has a link 146 pivoted to the end thereof. The link 146 extends rearwardly toward the carriage 32 (Fig. 14) and has its rearward end pivotally connected to a bell crank 148 mounted for rotation on a stud 150. The other arm of the bell crank 148 fits in a notch 152 at the lower end of a carriage locking slide 154. The slide 154 is mounted for vertical movement on a fixed bracket 156, and has two forwardly projecting guide pins 158 and 159 which extend through slots 160 and 161 respectively, formed in the supporting bracket 156, these pins being provided with the usual keepers 162. The slide 154 is resiliently held in its uppermost position by a tension spring 164 the upper end of which is anchored at a pin 166 carried in the bracket 156, and the lower end of which is secured to a pin 168 carried by the slide 154. A pair of carriage stop and positioning levers 170 and 171 are pivotally mounted on the shouldered studs 172 riveted to the slide 154, these levers having pins 176 projecting through slots 178 formed in the bracket 156 and forming an anchorage for the ends of a tension spring 180, the spring tending to hold the levers 170 and 171 in their upper position as limited by the engagement of the pins 176 with the upper ends of slots 178. The ends of the levers 170 and 171 are provided with opposed notches 182 for engagement with an adjustable stop tooth 184. The tooth 184 forms part of a suitably pre-formed strap 186 which extends around the square shaft 66. One end of the strap is provided with a stud 188 which extends through an opening in the other end of the strap and forms the pivot mounting for a locking cam 190. The straps may therefore be adjusted along the shaft 66 and clamped in adjusted positions. At the right hand end of the shaft 66 there is secured an operating lever 192 (Fig. 5), which has a stud 194 extending through an arcuate slot 196 formed in the carriage end plate 63, the stud 194 serving as mounting for one end of a tension spring 198, the other end of which is anchored to a pin 200. Thus, whenever it is desired to move one of the stop teeth 184 from engagement with the notches 182 in the levers 170 and 171, the lever 192 is swung counterclockwise (Fig. 5), thereby raising the stop teeth 184 from the positions in which they may engage the levers 170 and 171. The mounting for the cross rod 66 may be such that it may be readily removed and replaced with another rod having the stop teeth 184 positioned for a particular form which is to be used.

Figure 6:
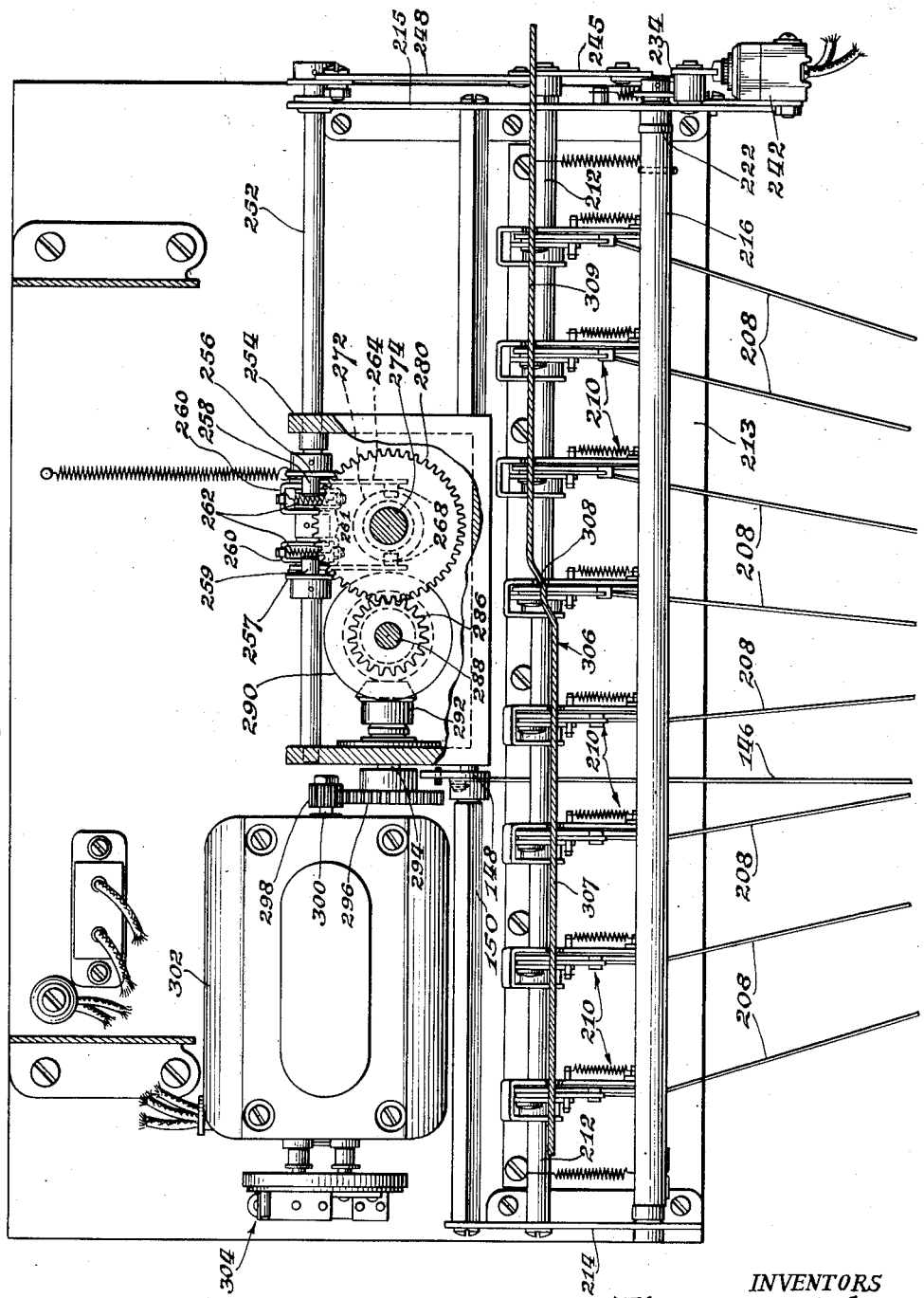
Fig. 6 is a horizontal sectional view taken on the line 6—6 of Fig. 5.
Figure 7:
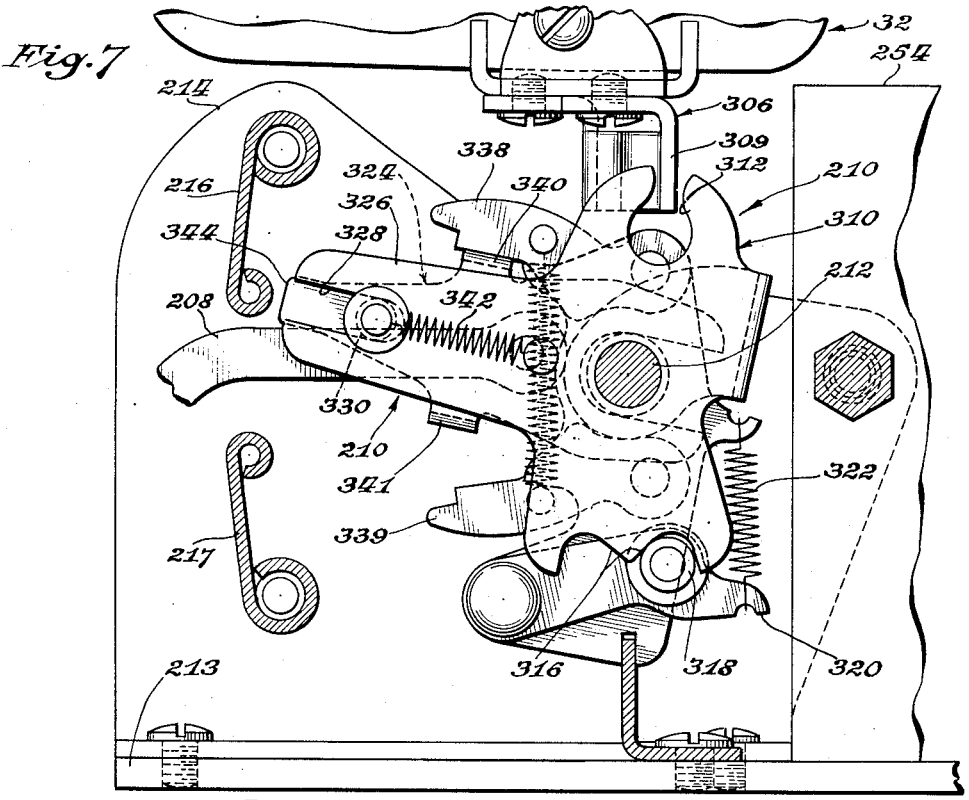
Fig. 7 is an enlarged vertical sectional view of parts of the stop mechanism for the carriage.

Each of the key stems 102 (Figs. 15 and 16) is provided with a slot for the reception of the forwardly extending arm 202 of a bell crank lever 203. The bell crank levers 203 are pivotally mounted on the cross rod 112 and have their rearward and upwardly extending arms 206 pivotally connected to links 208. As best shown in Figs. 2 and 6, these links 208 extend rearwardly beneath the racks or actuators 34 to the carriage mechanism.

Each of the links 208 is associated with a clutch and motor switch operating assembly 210 comprising the parts as shown in exploded view in Fig. 10. The assemblies 210 are adapted to be adjustably positioned on a shaft 212, which is secured to the end brackets 214 and 215 (Fig. 3) fixed to the base plate 213 of the machine.

Figure 4:
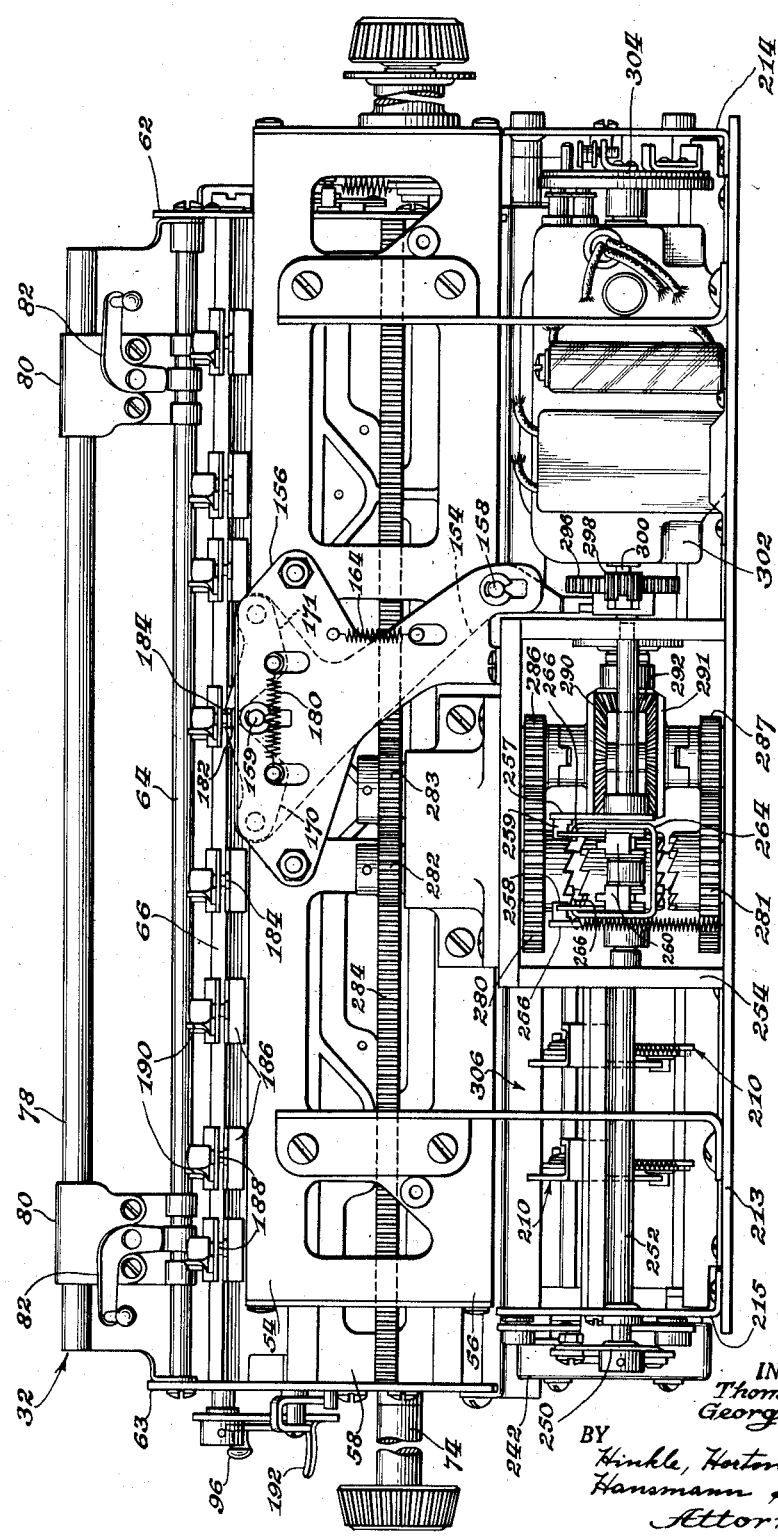
Fig. 4 is a transverse sectional view taken on the line 4—4 of Fig. 2.

Also mounted between the end brackets or plates 214 and 215 are a pair of bails 216 and 217 (Figs. 3 and 7 to 9). The left hand ends of these bails are pivoted on studs 218 and 219 respectively (Figs. 3 and 9), the curled ends of the bails being provided with bearing bushings 220. The right hand end of bail 216 is pinned to a stub shaft 222 (Figs. 3 and 11) while the right hand end of the lower bail 217 is pinned to a shaft 223 mounted for rotation in the end plate 215. A pair of arms 224 and 225 are respectively pinned to the shafts 222 and 223, and at their ends carry rollers 226, 227. These rollers cooperate with arms 228 and 229 forming part of a T-shaped lever 230 which is pivoted on a stud 232 carried near the end of a switch actuating arm 234, the latter arm being pivoted on a stud 236 mounted on the frame plate 215 and having a suitable rounded projection 238 for engagement with the protruding button 240 of a microswitch 242. The third arm 231 of the lever 230 is pivoted to the forwardly projecting arm of a bell crank lever 245 (Figs. 11 and 12), the other arm 246 of this lever being connected by a link 248 with an arm 250. The arm 250 is pinned to a shaft 252 which is mounted for rotation in the bracket 215 and the walls of a gear box 254 (Fig. 4). A pair of arms 256, 257 (Figs. 6, 11, and 12) are pinned to the shaft 252 and at their ends have opposed studs 258, 259, each of which projects between a pair of centering arms 260, 261 which are freely pivoted on the shaft 252 and are urged toward each other and into engagement with the stud by a tension spring 262 (Fig. 6). A bail shaped clutch shifting yoke 264 is pivoted on the shaft 252 and has a pair of inwardly extending lugs 266 which project between the spring tension centering arms 260, 261. The yoke 264 is provided with a pair of opposed studs 268 which project into a groove 270 formed in the shiftable double jaw clutch member 272.

The clutch member 272 is slidable upon a vertical shaft 274 mounted in suitable bearing bushings in the gear box 254. The jaw clutch member 272 is caused to rotate with shaft 274 by a feather key 276. The clutch faces of the clutch member 272 are respectively engageable with complementary jaw clutch parts 278, 279 formed as hubs of spur gears 280 and 281. A pinion 282 is secured to the upper end of the shaft 274 and meshes with an idler pinion 283, and the latter is in mesh with a rack 284. The rack 284, is secured to the carriage 32 and extends the full length thereof.

The gears 280 and 281 mesh with pinions 286 and 287 (Figs. 4 and 6) respectively, which are mounted for rotation on a shaft 288. Bevel gears 290 and 291 are also mounted for rotation on the shaft 288 and are keyed respectively to the pinions 286 and 287. A bevel drive pinion 292 meshes with the bevel gears 290 and 291 and thus drives them in opposite directions. The bevel drive pinion 292 is secured to a countershaft 294 suitably mounted in one of the side walls of the gear box 254 and having a gear 296 secured to its other end. The gear 296 is driven by a pinion 298 mounted on the armature shaft 300 of a motor 302. The motor is provided with a suitable speed governor switch mechanism 304.

It will be clear from the foregoing that by shifting the jaw clutch member 272 from its central position, the carriage 32 may be traversed in either direction. The means for controlling the direction in which the carriage is to be traversed is determined by a mechanism now to be described. This mechanism is controlled by a cam bar 306 suitably fixed to the end plates 62 and 63. As best shown in the section of Fig. 6 the cam bar 306 has two offset rectilinear portions 307, 309 joined by an S-shaped bend 308 at the center.

Each of the clutch and switch operating assemblies 210 (Figs. 7–10 and 17) includes a lever 310 which has a notch 312 formed in its upwardly extending arm 314. This notch 312 embraces the control cam bar 306. The lever 310 is mounted for rotation on the shaft 212 and has a downwardly projecting arm provided with two recesses 316 for engagement with a detent roller 318 mounted on the end of a pivoted arm 320, the roller being held in either one of the two notches 316 by a suitably anchored tension spring 322. A slide 324 is mounted for reciprocation on a forwardly projecting arm 326 of the lever 310, this arm having an elongated open-end slot 328 for the reception of a roller 330 mounted on a stud 332 secured to the slide 324. The rearward end of the slide 324 is provided with an open end slot 334 which embraces a roller 336 mounted on the shaft 212. The links 208, which it will be recalled, are pulled forwardly upon the depression of one of the carriage positioning control keys 30, have their rearward ends pivotally secured to the slides 324, respectively. Thus, when a key is depressed, the associated slide 324 is moved forwardly and it is held in its forward position by either one of two latches 338 or 339, which are adapted, respectively, to engage lugs 340 or 341 projecting sidewardly from slide 324. The slide 324 is biased to its rearward position by a tension coil spring 342 which engages the stud 332 and is anchored to a pin 345 mounted on the lever 310.

Figure 8:
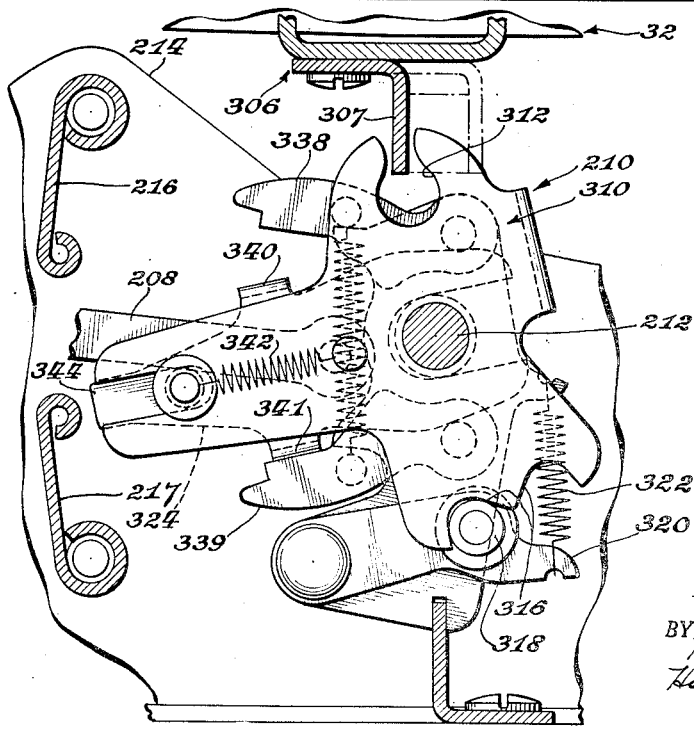

The slide 324 has its forward end projection 344 arranged for engagement with the beaded edge of the bail 216 when in one position (Fig. 7) and with the corresponding edge of bail 217 when in its other position (Fig. 8). When in its central position (Fig. 17) the projection 344 is in line with the space between bails 216 and 217.

Figure 12:
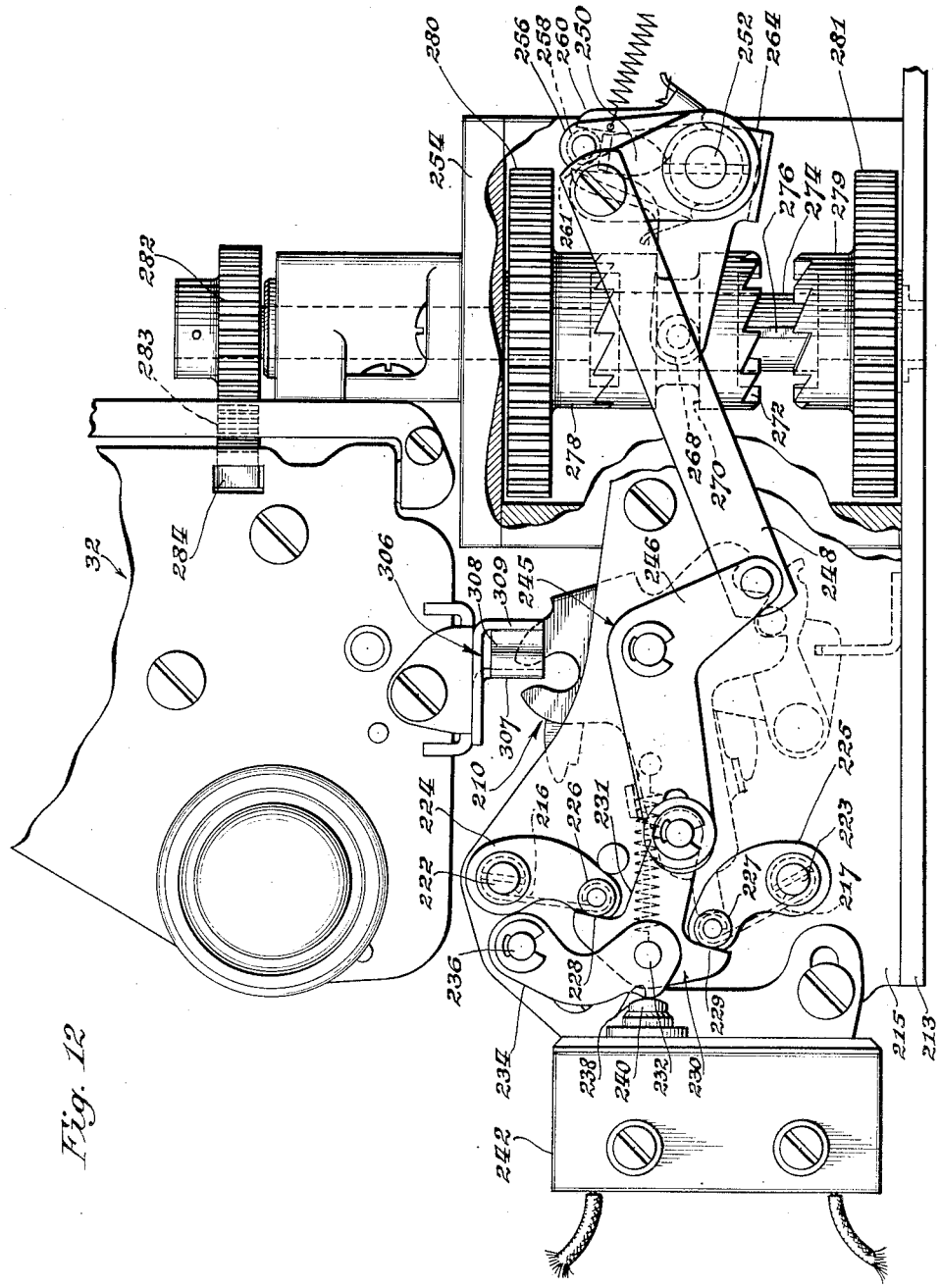
Fig. 12 is a view similar to Fig. 11 showing the parts in position for driving the carriage in a direction opposite to that occurring when the parts are in the positions shown in Fig. 11.

When the center of the carriage is to the right of a particular clutch and switch actuating assembly 210 the lever 310 thereof will be swung counterclockwise by the cam bar 306 toward the position which is shown in Fig. 8, the motion being completed by the spring actuated detent 318. In this position the projection 344 of the slide 324 is in position to engage the lower bail 217 so that upon actuation of the particular positioning key button 30 associated with such assembly, the projection 344 will engage the bail 217 and swing the latter counterclockwise (Figs. 8 and 12). Thus the shaft 223 and arm 225 will also be swung counterclockwise and the roller 227 thereof will engage the arm 229 of the T-shaped lever 230 and swing this lever as well as the arm 234 to the left (Fig. 12) thereby pressing the button 240 of the microswitch 242 to close the latter to energize motor 302. The rearwardly extending arm 231 will of course be swung clockwise (Fig. 12), thereby swinging the bell crank lever 245 counterclockwise, and through the link 249 rotating the shaft 252 clockwise. The shaft 252, through the resilient drive provided by arms 256, 257, 260, 261 and springs 262 moves the clutch yoke 264 clockwise to the position shown in Fig. 12, causing engagement of the clutch face of the member 272 with the clutch part 278, and thereby effecting a drive from the upper bevel gear 290 to the shaft 274. Thus the carriage is traversed toward the left until the S-shaped portion 308 of the cam bar 306 reaches the particular clutch and switch assembly which was actuated. When this occurs the cam bar portion 308 shifts the lever 310 to a central position so that the projection 344 will lie between the two bails 216 and 217 and be incapable of actuating either of them (Fig. 17). The switch 242 will therefore be opened and the jaw clutch member disengaged and moved to its central position.

When the carriage is at rest with its center in alignment with a particular clutch and switch operating assembly 210, as shown in Fig. 6, projection 344 will be centrally located between the bails 216 and 217 so that if the operator presses the button associated with such assembly 210, the end projection 344 will be incapable of engaging either of the bails 216 or 217 and the slide 324 will be pulled forwardly but none of the other parts will be actuated since the latches 338, 339 are held from engaging the lugs 340, 341 by virtue of their engagement with the sleeve roller 336.

From the foregoing it will be clear that the carriage will come to rest with its center over the particular assembly 210 which has been actuated. The levers 310 of all assemblies to the left of such actuated assembly 210 will be swung counterclockwise to the position shown in Fig. 8, while all the levers 310 of the assemblies to the right of the last actuated assembly will be swung clockwise to the position shown in Fig. 7. It will be noted that when the parts are in the positions shown in Fig. 7, the projection 344 is in position to actuate the bail 216 and swing the latter clockwise through the connected arm 224 and roller 226, and swing the T-shaped lever 230 counterclockwise to the position in which it is shown in Fig. 11. This movement of the lever 230 will, through the kinematic train previously described, shift the clutch member 272 downwardly to cause it to engage the clutch part 279. Thus the drive will be from the bevel gear 291, through pinion 287 and gear 281, causing the carriage to be traversed to the right.

It will be noted that the clutch and switch operating assemblies 210 are always in position to effect a traverse of the carriage in the proper direction so that upon the depression of any of the positioning key buttons 30 the carriage will immediately start moving in the direction to bring its center toward the particular assembly 210 controlled by the depressed key button 30. Upon attaining such position the clutch member 272 will be returned to its central normal position in which it does not engage either of the clutch members 278 or 279 and the switch 242 will be opened.

At approximately the time that the clutch is disengaged the stop tooth 184 will have passed over one of the levers 170 or 171 and will abut against the edge of the notch 182 in the other lever, these levers being retained in stopping position by the spring 180. It will be recalled that whenever any of the carriage positioning control keys 30 is depressed the slide 154 which carries the latching stop levers 170, 171, is moved downwardly so as to disengage the latter levers from the stop tooth 184 and permit the carriage to be traversed.

It will be observed that the slide 154 is held in its lowermost position during the traversing movement of the carriage. When the center of the carriage reaches the actuated assembly 210 the arm 310 is swung to its intermediate position and in so doing it swings the lug 340 or 341 from the position in which it is latched by the latch 338 or 339, thus permitting the spring 342 to pull the slide 324 rearwardly and thereby, through the link 208 and bell crank lever 203, return the key 30 to its normal position, and also will permit the slide 128 to move upwardly and thus, through the arms 134 and 144, link 146, and bell crank 148, move the slide 154 upwardly so that the latch levers 170, 171 will be in position to arrest the carriage exactly in the selected tabular position.

The motor 302 is preferably utilized not only to shift the carriage but also to operate the adding machine mechanism. For this purpose an additional gear train driven either from the pinion 299 or the gear 296 may be utilized to oscillate the main shaft, such gear train including the usual type of clutch which automatically disengages itself after the completion of one or a definite number of revolutions. Such means being well known in the art, they are not disclosed herein, except, in Fig. 18, a part of such means is indicated by a gear 349 meshing with the motor drive pinion 299. It will be understood that when the single motor is utilized to drive both the adding machine mechanism and to shift the carriage, the motor need never supply the power necessary for the performance of both of these operations simultaneously, since in regular use of the machine the operator will press one of the carriage positioning buttons 30, and, while the carriage is shifting to the desired position, the operator may be entering the item to be added or printed in the selected column.

In most instances the control bars 26 and 28 (Fig. 1) and one or more of the control keys 24 in addition to tripping the one revolution clutch mechanism, may be utilized to operate a switch, such as a switch 350 (Fig. 18), connected in parallel with the switch 242, for controlling the energization and de-energization of the motor 302, and in other cases these controls may be arranged to operate the push button 240 of the microswitch 242. An anti-sparking mesh comprising a capacitor 352 (Fig. 18) and resistor 354, in parallel, and shunting the switches 242 and 350, may be provided to reduce corrosion and pitting of the contacts of the governor mechanism 304 as well as of the switches 242 and 350.

The machine may be used for a variety of accounting and bookkeeping purposes and is shown in Fig. 1 as being used to compute and record a payroll. The particular form utilized is provided with eight columns in which amounts are to be entered. For example, the amount of the gross pay may be entered in the first column, the various deductions entered in succeeding columns subtracted from the gross pay, and the net amount to be paid entered in the last column by taking a total.

As previously indicated, the machine may be of a type in which a number of accumulators are employed, as shown in Fig. 2, by the provision of the racks 53 for the operation of the different accumulators, the selection of the accumulators being effected either by control keys such as the keys 24, or by the column selecting key buttons 30.

It will be noted that since the carriage is positively driven in both directions, it is unnecessary to provide an energy storing spring to move the carriage in one direction as is common practice in various types of office machines having shiftable carriages. This is advantageous, not only due to the eliminationn of the spring and associated parts, but also because the maximum load due to the shifting of the carriage will be approximately one-half that required if the motor were required to store energy in the carriage return spring during the time that the carriage was being shifted.

Furthermore it will be observed that the carriage may be caused to move from any of its columnar positions to any other position merely by the depression of a single key, and that the operator need not depress any "skip" keys or controls when it is desired to shift the carriage through one or more of its columnar positions in which no entries are to be made.

While we have shown and described a particular embodiment of our invention it will be apparent to those skilled in the art that numerous variations and modifications thereof may be made without departing from the underlying principles of the invention. We therefore desire, by the following claims, to include within the scope of the invention all such variations and modifications by which substantially the results of our invention may be obtained through the use of substantially the same or equivalent means.

We claim:

1. In a printing calculating machine having a frame and a carriage mounted for sliding movement on the frame, the combination of an electric motor, reversible driving means for the carriage including a clutch, a member secured to the carriage, said member providing an indication of the center of the carriage and two different indications respectively for the portions of the carriage to the right and to the left of the center, a plurality of selecting elements to determine the columnar position to which the carriage is to be moved, a pair of bails, means cooperating with said member and operated by the selecting elements to swing one or the other of said bails depending upon the position of said member with respect to the means operated by an operated selecting element, and operating connections between said bails and said clutch whereby the bail which is swung will determine the direction in which the carriage is to be driven by said reversible driving means to move it to the position determined by the operated selecting element.

2. In a printing calculating machine having a frame and a carriage mounted for sliding movement on the frame, the combination of an electric motor, driving means for the carriage including a reversing clutch driven by the motor, two directional yielding means including springs for causing engagement of the clutch respectively for forward and reverse drive, a member carried by the carriage, said member providing an indication of the center of the carriage and different indications respectively for the portions of the carriage to the right and to the left of the center, a plurality of manually operated selecting elements to determine the columnar position to which the carriage is to be moved, means including said member and said selecting elements to determine the direction in which said clutch is operated through said yielding clutch engaging means, means for latching the carriage in any one of a plurality of columnar positions, and means operable in common by said selecting elements to release said latching means.

3. In a printing calculating machine having a frame and a carriage mounted for sliding movement on the frame, the combination of an electric motor, driving means for the carriage including a reversing clutch, a member carried by the carriage, said member providing an indication of the center of the carriage and different indications respectively for the portions of the carriage to the right and to the left of the center, a plurality of selecting elements to determine the columnar position to which the carriage is to be moved, a plurality of control parts spaced along the path of movement of the carriage and respectively operated by said selecting elements, means operated by said member to position the control parts in one of three positions depending upon whether the control part is at the center or to the right or left of the cener of the carriage, and means operable by said control parts to determine the direction in which said clutch is operated thereby to move the carriage directly to the position determined by an operated selecting element .

4. In a carriage positioning mechanism for calculating machines and the like, in which the carriage is mounted for transverse movement relative to the machine frame, the combination of a plurality of carriage positioning assemblies, key operated means including a key connected to each of said assemblies for actuating the latter, means to prevent the depression of more than one key at a time, means for locking the carriage in selected position, means operable upon depression of any of the keys to release said locking means, a bar secured to the carriage and extending the full length thereof, said bar having a short central portion and end portions displaced in opposite directions from the central portion, said bar being cooperable with said carriage positioning assemblies to position them correspondingly depending upon whether they are located at the center to to the right or left of the center of the carriage, an electric motor, means including a reversible drive clutch forming a driving connection between the motor and the carriage, a switch controlling the supply of electrical energy to the motor, a pair of elements operable by parts of said assemblies respectively effective to position said clutch for driving said carriage in one direction or the other, and means to close said switch upon operation of either of said elements thereby to effect transverse movement of the carriage directly to the position selected by an operating key.

5. In a carriage positioning mechanism for calculating machines and the like, in which the carriage is mounted for transverse movement relative to the machine frame, the combination of a motor, a reversible clutch forming a part of a driving connection between the motor and the carriage, a plurality of carriage positioning assemblies, key operated means including a key connected to each of said assemblies for actuating the latter, means for locking the carriage in selected position, means operable upon depression of any of the keys to release said locking means, means to position said assemblies differentially depending upon whether they are located at the center or to the right or left of the center of the carriage, a pair of clutch positioning elements respectively operable by such of said assemblies as are located to the right and such of said assemblies as are located to the left of the center of the carriage thereby to determine the direction of carriage drive, and means operable by either of said elements to control the energization of the motor.

6. In a carriage positioning mechanism for calculating machines and the like, the combination of a machine frame, a carriage transversely shiftable upon said frame, a motor for moving said carriage, a reversing drive mechanism between said motor and said carriage including a drive reversing clutch, a plurality of assemblies mounted on the frame of the machine adjacent the path of the travel of the carriage and spaced along the path of travel at different columnar positions at which the center of the carriage is to be positioned, a member carried by the carriage, said member being cooperable with said assemblies and having a neutral center part and parts to the right and the left of the center which differ in position from the neutral part and from each other, manually operable means for respectively actuating said assemblies, and means on said assemblies for shifting the reversing clutch in one direction or another depending upon whether the part of said member to the right or the left of the neutral center part thereof is in cooperative engagement with the actuated assembly.

7. In a carriage positioning mechanism for calculating machines and the like, the combination of a machine frame, a carriage transversely shiftable upon said frame, a motor for moving said carriage, a reversing drive mechanism between said motor and said carriage including a drive reversing clutch, a plurality of assemblies mounted on the frame of the machine adjacent the path of the travel of the carriage and spaced along the path of travel at different columnar positions at which the center of the carriage is to be positioned, a member carried by the carriage, said member being cooperable with said assemblies and having a neutral center part and parts to the right and the left of the center which differ in position from the neutral part, manually operable means for respectively actuating said assemblies, means on said assemblies for shifting the reversing clutch in one direction or another depending upon whether the part of said member to the right or the left of the neutral center part thereof is in cooperative engagement with the actuated assembly, a switch for controlling the operation of the motor, and means operated upon actuation of any of said assemblies to operate said switch.

8. In a calculating machine or the like, the combination of a machine frame, a carriage mounted for transverse movement relative to the frame, an electric motor, a reversing clutch and driving connection between the motor and the carriage, a plurality of manually operable keys for selecting the columnar position to which the carriage is to be moved, a plurality of clutch actuator assemblies spaced along the path of movement of the carriage and connected to said keys for selective operation thereby, each of said assemblies being operable when in one position to operate said reversing clutch to cause the motor to drive said carriage in one direction and when in another position to shift said reversing clutch to cause the carriage to be driven in the opposite direction by said motor, and means carried by the carriage to move the assembly to one or the other of its said two positions depending upon whether the center of the carriage is to the left or right of the assembly.

9. The combination set forth in claim 8, in which means is provided for preventing the depression of more than one key at a time, and in which there are locking means operated to carriage releasing position upon depression of any of the keys, said locking means being cooperable with the carriage accurately to hold it in the selected columnar position to which it is moved by the motor.

10. In a calculating machine or the like, the combination of a machine frame, a carriage mounted for transverse movement relative to the frame, an electric motor, a reversible driving connection between the motor and the carriage, a plurality of manually operable keys for selecting the columnar position to which the carriage is to be moved, a plurality of actuator assemblies spaced along the path of movement of the carriage and connected to said keys for selective operation thereby, a pair of bails respectively operable upon said reversible driving connection to cause the motor to drive said carriage in opposite directions, means controlled by the carriage position to position said assemblies for cooperation with one or the other or neither of said bails, a switch for energizing said motor, and means to operate said switch when either bail is operated.

11. In a calculating machine or the like, the combination of a machine frame, a carriage mounted for transverse movement relative to the frame, an electric motor, a reversible driving connection between the motor and the carriage, a plurality of manually operable keys for selecting the columnar position to which the carriage is to be moved, a plurality of actuator assemblies spaced along the path of movement of the carriage and connected to said keys for selective operation thereby, a pair of bails respectively operable upon said reversible driving connection to cause the motor to drive said carriage in opposite directions, means controlled by the carriage position to position said assemblies for cooperation with one or the other or neither of said bails, a switch for energizing said motor, means to operate said switch when either bail is operated, latching means to hold the carriage in its several columnar positions, and means operable by the operation of any of the keys to release the latching means.

12. In a printing calculating machine having a frame and a printing carriage mounted for sliding movement relative to the frame, the combination of a motor, means including a clutch and reversible gearing for connecting the motor to the carriage to drive the latter in either direction, a source of power, a switch for connecting said source to the motor for energizing the latter, a plurality of assemblies for operating the clutch and said switch, said assemblies being located along the path of movement of the carriage, and means carried by the carriage for positioning said assemblies in either of two extreme positions depending upon whether the assembly is located to the right or to the left of the center of the carriage, whereby the direction of carriage drive is determined.

13. In a calculating machine or the like, the combination of a machine frame, a carriage mounted for transverse movement relative to the frame, an electric motor, a connection including a clutch for driving the machine from the motor, a reversible driving connection between the motor and the carriage, a plurality of manually operable keys for selecting the columnar position to which the carriage is to be moved, a plurality of actuator assemblies spaced along the path of movement of the carriage and connected to said keys for selective operation thereby, each of said assemblies being operable when moved from normal to one operating position to condition said reversible driving connection to cause the motor to drive said carriage in one direction, and when moved from normal to another operating position to condition said reversible driving connection to cause the carriage to be driven in the opposite direction by said motor, and means carried by the carriage to move the assembly to one or the other of its said two operating positions depending upon whether the center of the carriage is to the left or right of the assembly.

THOMAS O. MEHAN.
GEORGE J. UHLIG.

REFERENCES CITED

The following references are of record in the file of this patent:

UNITED STATES PATENTS

| Number | Name | Date |
| --- | --- | --- |
| 2,216,636 | Webb | Oct. 1, 1940 |
| 2,258,116 | Khalil | Oct. 7, 1941 |
| 2,294,948 | Avery | Sept. 8, 1942 |
| 2,442,402 | Davidson et al. | June 1, 1948 |